United States Patent [19]
Hamamoto

[11] Patent Number: 5,838,335
[45] Date of Patent: Nov. 17, 1998

[54] GRAPHIC DATA PROCESSING METHOD AND DEVICE

[75] Inventor: Takeshi Hamamoto, Tokyo, Japan

[73] Assignee: NEC Corporation, Tokyo, Japan

[21] Appl. No.: 844,633

[22] Filed: Apr. 21, 1997

[30] Foreign Application Priority Data

Apr. 22, 1996 [JP] Japan .................................. 8-100221

[51] Int. Cl.⁶ .................................................. G06T 1/60
[52] U.S. Cl. ........................................ 345/507; 345/501
[58] Field of Search ................................. 345/501, 502, 345/505, 507, 508, 509, 511, 517, 515, 523–525, 429, 152

[56] References Cited

U.S. PATENT DOCUMENTS

| | | | |
|---|---|---|---|
| 5,206,628 | 4/1993 | Kelleher | 345/152 |
| 5,287,438 | 2/1994 | Kelleher | 345/432 |

FOREIGN PATENT DOCUMENTS 5-206275  8/1993  Japan .

OTHER PUBLICATIONS

T. Ohtsuki et al., "Minimum Partitioning Rectilinear Regions", Journal of Information Processing Society, vol. 24, No. 5, Sep. 1983, pp. 647–653.

*Primary Examiner*—Kee M. Tung
*Attorney, Agent, or Firm*—Sughrue, Mion, Zinn, Macpeak & Seas, PLLC

[57] ABSTRACT

A graphic data processing device is proposed that enables high-speed graphic processing for repeated graphic in semiconductor layout data. A plurality of sets of systematic array graphic data are inputted in an input device, the inputted systematic array graphic data are checked in an array information analyzer to confirm that the grid widths of the array grids of the different data are equal, and data are converted at an array graphic converter to systematic array graphic data sharing common array grid information. The data can then undergo graphic processing at a graphic processor in the form of systematic array graphic data without further alteration.

2 Claims, 12 Drawing Sheets

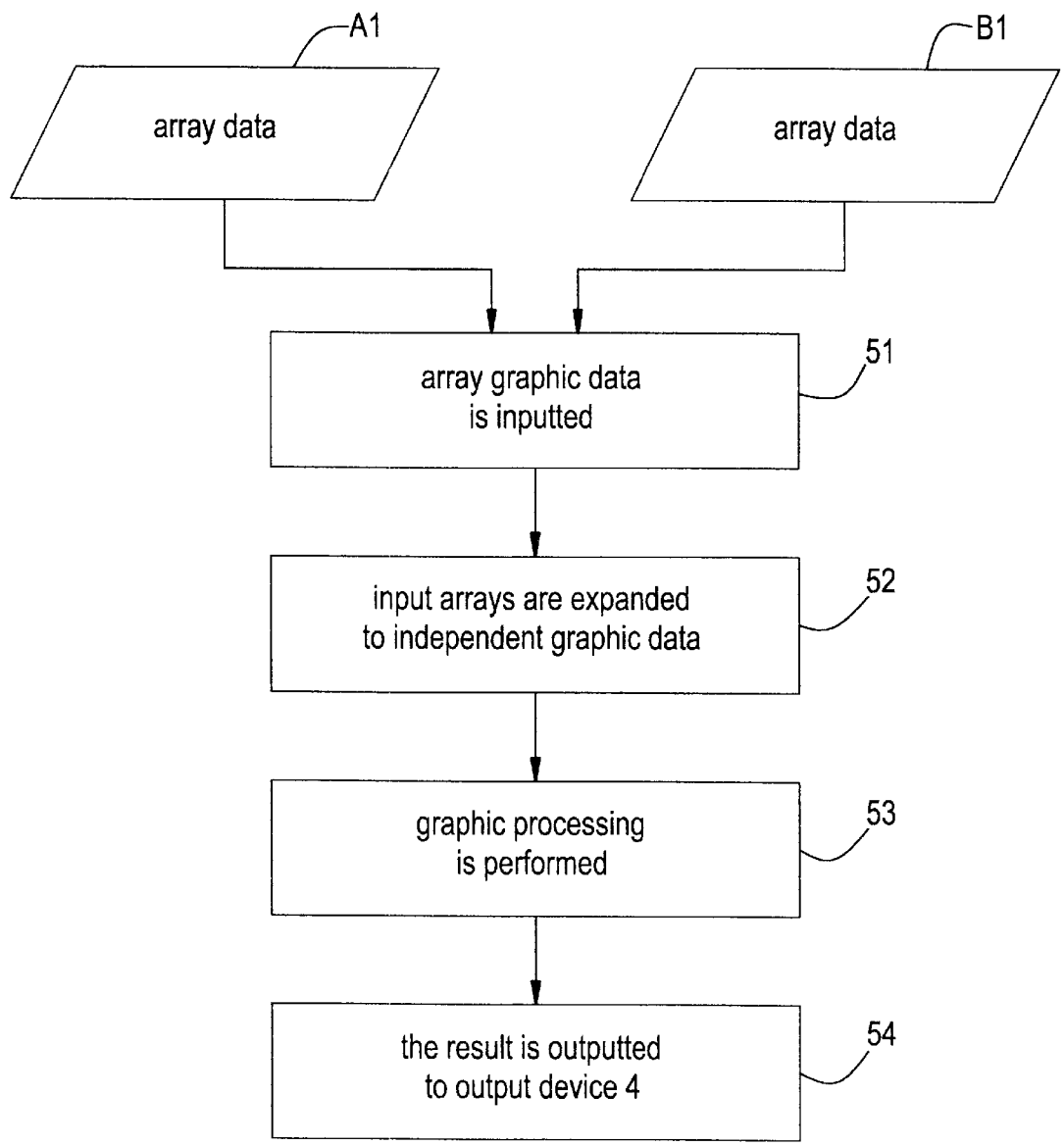

GRAPHIC DATA PROCESSING METHOD AND DEVICE

BACKGROUND OF THE INVENTION

1. Field of the Invention

The present invention relates to an array graphic data processing method and device, and in particular to a graphic data processing method and graphic data processing device for integrated circuit layout.

2. Description of the Related Art

Of the different types of integrated circuit design data, layout data in particular are represented as collections of graphic data comprising combinations of immense numbers of polygons. Typical layout data involve as many as several tens of millions of trapezoids, and computer processing of such a huge volume of data necessitates lengthy processing time and extensive computer resources. With this type of integrated circuit layout data, performing operations such as design rule checks, data conversion for mask making, and extraction of connection information requires graphic processing such as logical OR, AND, NOR, and NAND processing as well as oversize and undersize processing. Groups of graphics arranged in systematically repeating units make up a large portion of the layout data when performing graphic processing of layout data for integrated circuits in general, and particularly for certain types of memory such as DRAM, and there is consequently a need to increase the speed of processing groups of graphics arranged in systematically repeating units. In this case, groups of graphics arranged in systematically repeating units are standard units made up of a certain quantity of polygon data (hereinbelow referred to as "unit graphics") that are arranged at equal intervals vertically and horizontally on a grid pattern, and can therefore be referred to as "systematically arrayed graphic data." As shown in FIG. 7A, systematically arrayed graphic N1 data are determined by unit graphic N2, the number of arranged rows N3, the number of arranged columns N4, and array grid N5 which determines the position of arrangement. Here, the array grid itself is determined by grid origin N6 and grid width N7.

FIG. 1 is a block diagram showing a prior-art graphic data processor for systematically arrayed graphic data. The prior-art graphic data processor is made up of storage device 1' that stores array graphic data, input device 2 that reads array graphic data to storage device 1', data processor 3' that performs data processing such as graphic processing on array graphic data, and output device 4 that outputs the results of graphic processing.

Storage device 1' is made up of array graphic data storage section 11 that stores inputted systematically arrayed data, and expanded graphic data storage section 13 that stores expanded graphic data which is the outputted result of expansion processing on inputted array graphic data. Data processor 3' is made up of expansion processor 34 that reads array graphic data from array graphic data storage section 11 and expands the data to graphic data that is independent of an array, and graphic processor 35 that performs various graphic processing on the expanded graphic data outputted by expansion processor 34.

Logical OR graphic processing for two sets of systematically arrayed graphic data having different grid origins will next be explained. Array A1 and array B1, which are two sets of systematically arrayed graphic data having equal grid width and an equal number of array rows and columns as shown in FIG. 7B and 7C, will first be considered as the input data.

Arrays A1 and B1 are each composed of unit graphics A2 and B2, respectively, grid origins A3 and B3, respectively, an equal grid width D1, an equal number of array rows X1, and an equal number of array columns Y1. Here, in a case in which array A1 and array B1 are arranged such that grid origins A3 and B3 coincide as in array AB1 of FIG. 3A, i.e., when array A1 and array B1 are arranged on a common array grid, array expansion processing of the arrays is not necessary, and graphic processing can be completed by merely carrying out a graphic operation of the two unit graphics. In more concrete terms, graphic processing of array A1 and array B1 can be achieved by graphic processing of unit graphics A2 and B2, making the resulting graphic C2 the unit graphic, and finding new array graphic data C1 in which the array grid and numbers of array rows and columns are equal to those of arrays A1 and B1 (FIG. 3B).

However, in actual layout data for integrated circuits such as DRAMs, array graphic data are not limited to arrangements with coinciding grid origins, but rather, in the greater portion of cases, are arranged on array grids having differing grid origins as in array AB2 shown in FIG. 4A. In addition, the number of sets of input array graphic data is frequently greater than two, thereby necessitating processing of a plurality of overlapping sets of array graphic data.

As an example of the processing of this type of input data in the prior art, a case in which array AB2 of FIG. 4A is inputted and logical OR graphic processing is performed will first be described with reference to the block diagram of FIG. 1, the flow chart of FIG. 2, and the operation illustrations of FIG. 7 and FIG. 4. First, in Step 51, the values of unit graphics A2 and B2, which are constituent elements of array A1 and array B1, respectively, grid origins A3 and B3, grid width D1, array row number X1, and array column number Y1 are stored to array graphic data storage section 11 of memory device 1' by input device 2. In order to represent the areas of overlap between array A1 and array B1 in array graphic data, array A1 and array B1 must be represented on a common array grid. In the prior art, it is impossible to process the areas of overlap between array A1 and array B1 as array graphic data because the prior art lacks a method of converting a plurality of array graphics to array graphics having a common array grid. Accordingly, arrays A1 and B1 represented as unit graphic arrays are expanded and arranged into an independent graphic group by array graphic expansion processor 31 of data processor 3'. To explain the expansion process of array A1 in more concrete terms, unit graphic A2 is first arranged on grid origin A3. Unit graphic A2 is then arranged at coordinates moved exactly the grid width D1 to the right. After repeating this arranging operation a number of times equal to array row number X1, unit graphic A2 is next arranged at a coordinate moved up exactly the array width D1 from the grid origin. Unit graphic A2 is then arranged at a coordinate moved to the right exactly array width D1 from the coordinate at which it is currently placed. In this way, a systematic array graphic expansion process can be effected by arranging the unit graphic horizontally a number of times equal to the array row number, and repeating this operation a number of times equal to the array column number. The expansion process of array B1 is performed in the same way as array A1. In Step 52, array A1 is converted to graphic data group A4 and array B1 is converted to graphic data group B4 as shown in FIG. 4B as results of array graphic expansion process 32, and each are stored in expansion graphic data storage section 13 of storage device 1'. In Step 53, graphic data groups A4 and B4 are each read from expansion graphic data storage section 13 at graphic processor 35, overlap such as graphic data group AB2 is considered for each, and a logical OR graphic operation is executed. Finally, in Step 54, graphic data group C3 (FIG. 4C), which is the result of graphic processing, is outputted to output device 4.

However, the above-described prior art has the following problems:

(1) The input of a plurality of sets of array graphic data having differing array grids necessitates array expansion processing. This is because inputted array graphic data is of a plurality of sets of data which are moreover on differing array grids, and therefore, graphics that are to be repeating units in the overlapping areas cannot be determined. In addition, actual graphic processing involves repeated processing in which graphic processing output is subjected to still further graphic processing with other array graphic data, and as a result, the array grids of different sets of inputted array graphic data differ in nearly every case. As a result, the prior-art method had no recourse but expansion of arrays and graphic processing.

(2) When carrying out repeated graphic processing, an array that has been expanded one time requires expansion processing in subsequent processes. This is because array information such as the array grid is lost as soon as graphic processing is performed on a differing array grid and the output graphic is expanded. In addition, if further repeated graphic processing is carried out on this output graphic, input array graphic data must also undergo expansion processing because it cannot be processed as an array.

(3) Graphic processing of a plurality of array graphic data sets together is time-consuming. This is because a plurality of input array graphic data sets necessitates expansion processing, and as the graphics grow in number through expansion processing, the number of graphic processing operations increases dramatically.

(4) Graphic processing of a plurality of array graphic data sets requires the use of a vast amount of memory. This is because a plurality of input array graphic data sets necessitates expansion processing, and through expansion processing, the volume of graphic data increases more than 100 times.

SUMMARY OF THE INVENTION

The object of the present invention is to provide a graphic data processing method and device that allow processing of graphics without expanding arrays, that processes graphics at high speed, and that allows a decrease in the amount of memory.

To achieve the above-described object, the present invention proposes a graphic data processing method that comprises the steps of:

inputting array graphic data for first, second, . . . and nth ($n \geq 2$) arrays that are arranged in overlapping positions and that have identical grid width, number of array rows, and number of array columns but have differing grid origin and unit graphics;

determining the grid origin of a common array which is a systematic array graphic in which the first to nth arrays are synthesized, and determining grid width as a value equal to grid widths of the first to nth arrays;

dividing the first to nth unit graphics at grid lines of the common array and determining new array graphic data;

determining areas in which the first to nth arrays of the common array overlap as areas to be subjected to graphic processing;

executing a logical OR process of the determined array graphic data within the grid frame of any corner of the areas to be subjected to graphic processing, and finding a unit graphic of the common array; and outputting determined array graphic data of areas besides those to be subjected to graphic processing, and unit graphics of the common array.

In addition, the present invention proposes a graphic data processing device that includes:

an input device that inputs array graphic data of first, second, . . . and nth ($n \geq 2$) arrays that are arranged in overlapping positions and that have identical grid width, number of array rows, and number of array columns, but have differing grid origin and unit graphics;

an array graphic data storage device that stores the array graphic data;

a data processing device that includes array information analyzing means that reads the array widths of the first to nth arrays from the array graphic data storage device and confirms that these array widths are equal; array graphic converting means that determines the grid origin of a common array which is a systematic array graphic in which the first to nth arrays are synthesized, determines grid width as a value equal to grid widths of the first to nth arrays, divides the first to nth unit graphics at grid lines of the common array, and determines new array graphic data; and graphic processing means that determines areas in which the first to nth arrays overlap in the common array as areas to be subjected to graphic processing, executes a logical OR process of the determined array graphic data within the grid frame of any corner of the areas to be subjected to graphic processing, and finds unit graphics of the common array; and an output device that outputs determined array graphic data of areas besides those to be subjected to graphic processing, and unit graphics of the common array.

The array information analyzing means checks whether or not the grid widths of the array grids are equal for all inputted array graphic data together. If the grid widths are equal, it is judged that the inputted array graphic data can be converted to array data on a common array grid, whereby a process is executed at the array graphic converting means in which unit graphic data of the common array graphic data are produced from the original graphics of the inputted array graphic data.

The present invention provides the following effects:

(1) Graphic processing can be accomplished without expansion of arrays. This effect can be obtained because, as long as array graphic data that overlap repeatedly at differing positions have equal grid widths, regularity can be imposed through forced division on a common grid, thereby allowing processing as array graphic data.

(2) Graphic processing can be effected using array graphic data even in cases of repeated graphic processing. This effect is obtained in the present invention through conversion of array graphic data whereby both the inputted array graphic data and outputted array graphic data of graphic processing are arranged on a common array grid, with the result that data can always be processed as array graphic data even in repeated graphic processing.

(3) The processing time and memory capacity required for graphic processing can be reduced. This effect is obtained because graphic processing can be effected without expanding the array graphic data. The volume of array graphic data greatly increases as a result of the expansion process. Moreover, the increase in the number of graphics brings about an increase in the number of processing operations. Layout data, for example, include many sets of large-scale array graphic data and require repetitious graphic processing when carrying out, for example, DRC (Design Rule Checking) graphic processing. The present invention enables the memory volume and processing time needed for design data for a large-capacity DRAM to be cut to about 1/100 that of the prior art.

The above and other objects, features, and advantages of the present invention will become apparent from the following description with references to the accompanying drawings which illustrate examples of the present invention.

BRIEF DESCRIPTION OF THE DRAWINGS

FIG. 2 is a flow chart illustrating the operation of the graphic data processing device shown in FIG. 1.

DETAILED DESCRIPTION OF THE PREFERRED EMBODIMENTS

Figure 5:
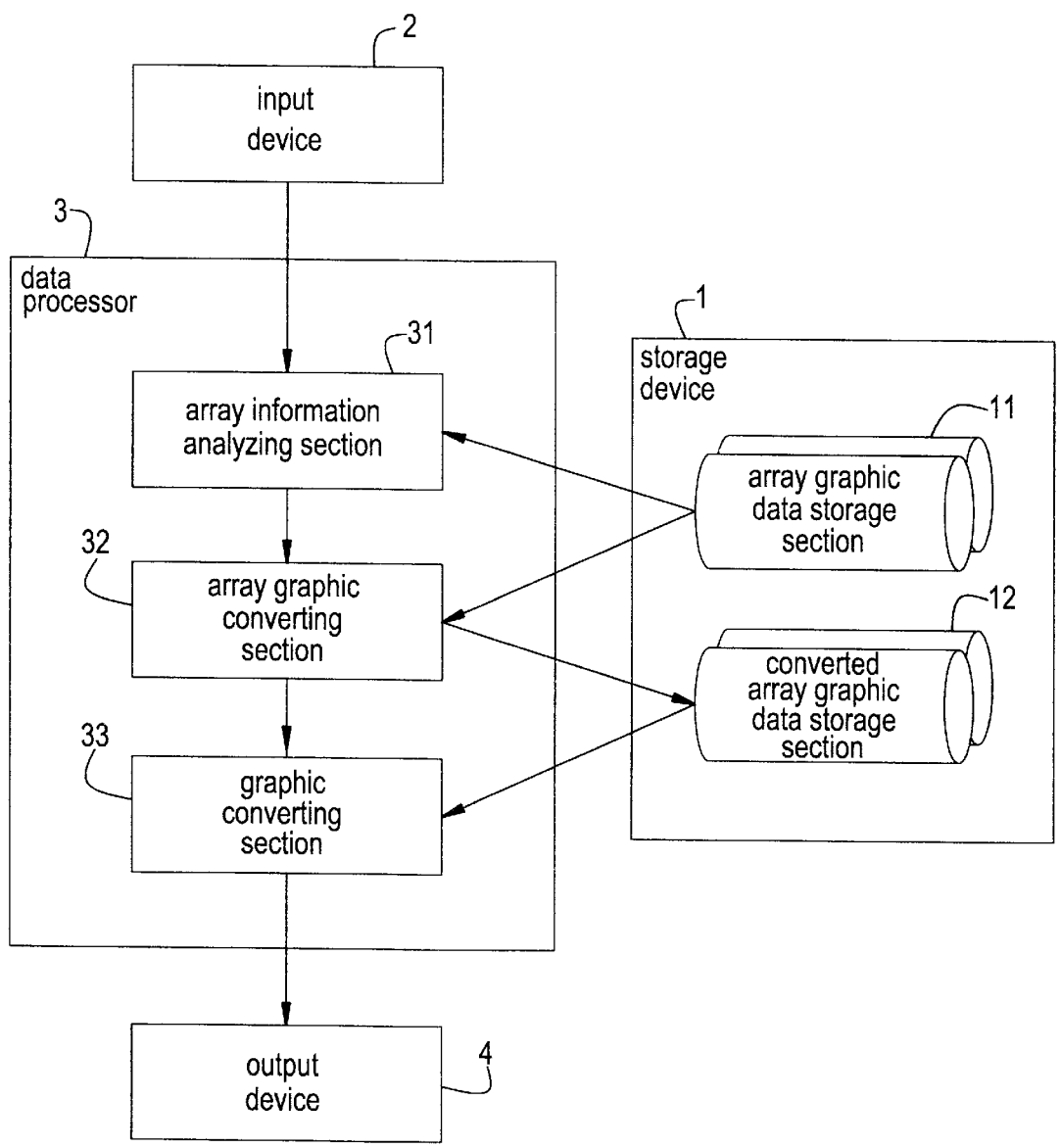
FIG. 5 is a block diagram showing the construction of a graphic data processing device according to an embodiment of the present invention.

Referring to FIG. 5, a graphic data processing device according to an embodiment of the present invention is made up of storage device 1 that stores graphic data, input device 2 that reads conferred array graphic data, data processor 3 that carries out graphic processing of array graphic data that has been inputted and stored in storage device 1, and output device 4 that outputs the results of processing. Storage device 1 is made up of array graphic data storage section 11 that stores input array graphic data, and converted array graphic data storage section 12 that stores synthesized array graphic data resulting from data processing. Data processing device 3 is made up of array information analyzing section 31, array graphic converting section 32, and graphic processing section 33.

Figure 1:
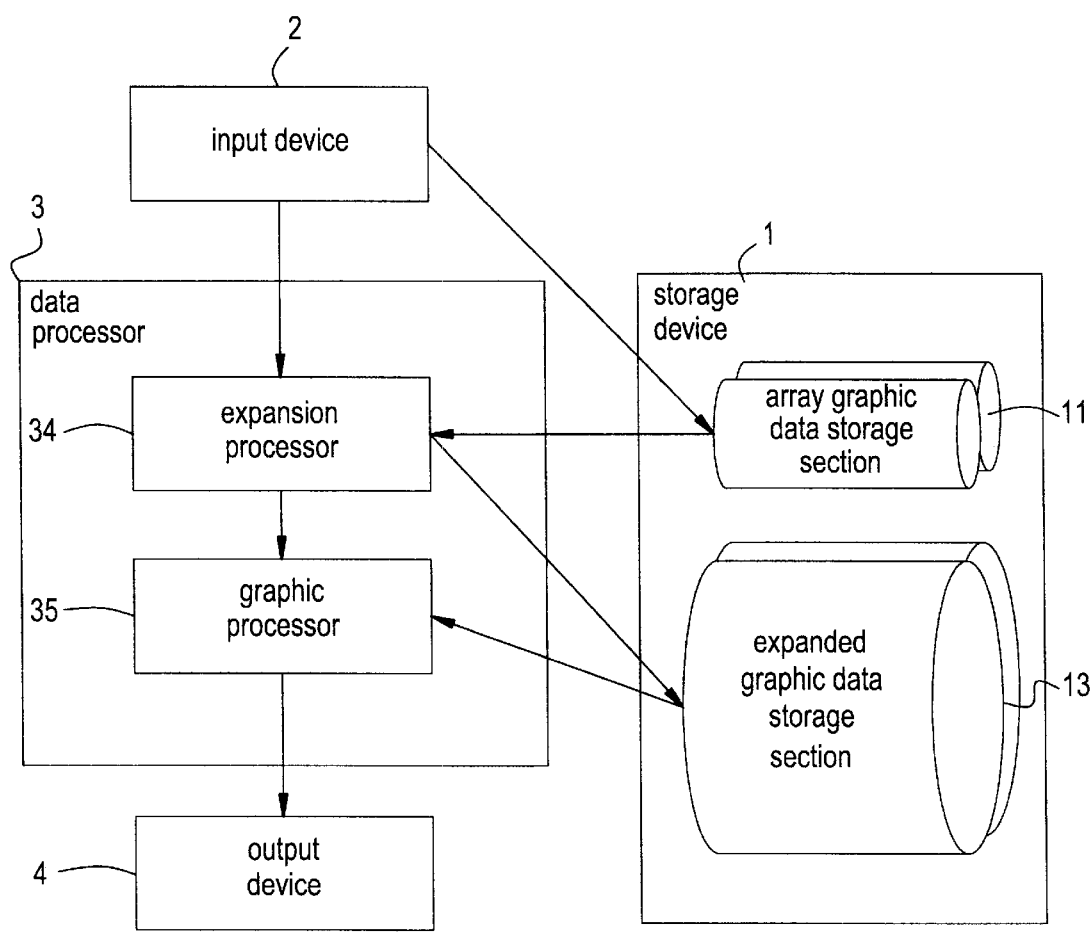
FIG. 1 is a block diagram showing the construction of a graphic data processing device of the prior art.
Figure 3A:
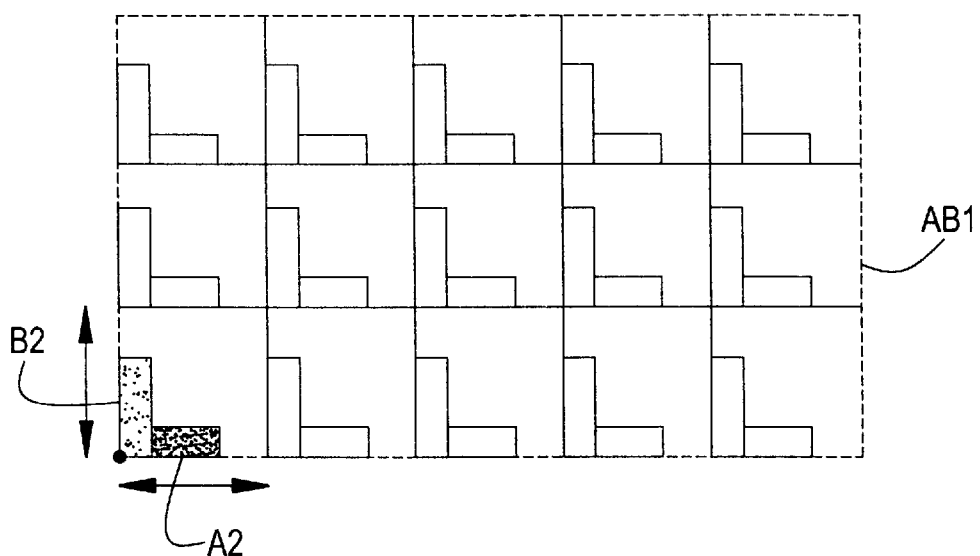
FIG. 3A shows array AB1 in which arrays A1 and B1 are arranged such that grid origins A3 and B3 coincide.
Figure 3B:
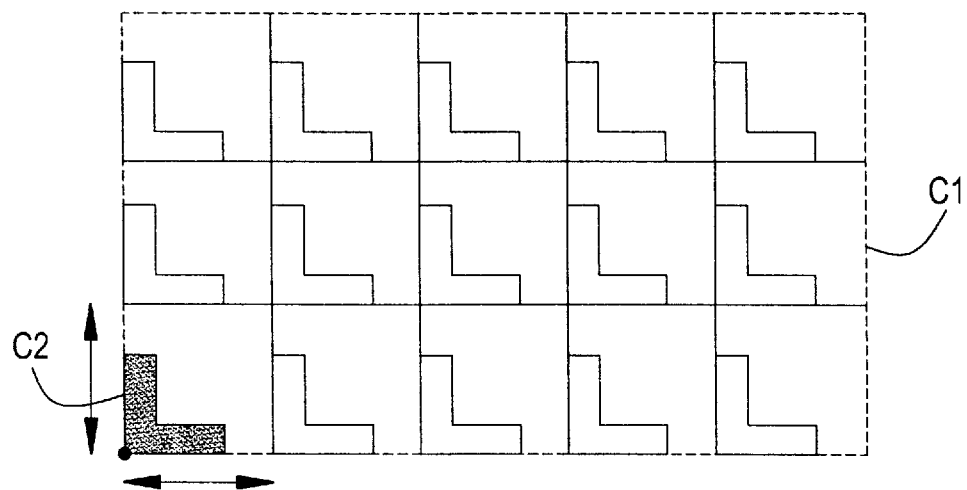
FIG. 3B shows array graphic data C1 that takes as unit graphic a graphic C2 which is obtained as the result of graphic processing of unit graphics A2 and B2.
Figure 4C:
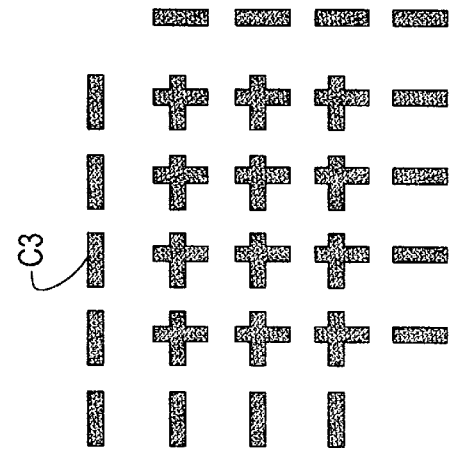
FIG. 4C shows graphic data group C3 which is obtained as the result of a logical OR graphic operation of graphic data groups A4 and B4.
Figure 4B:
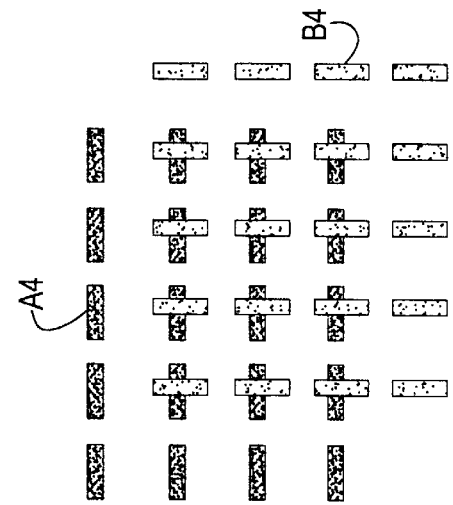
FIG. 4B shows graphic data groups A4 and B4 that are obtained as the result of expansion processing of arrays A1 and B1.
Figure 4A:
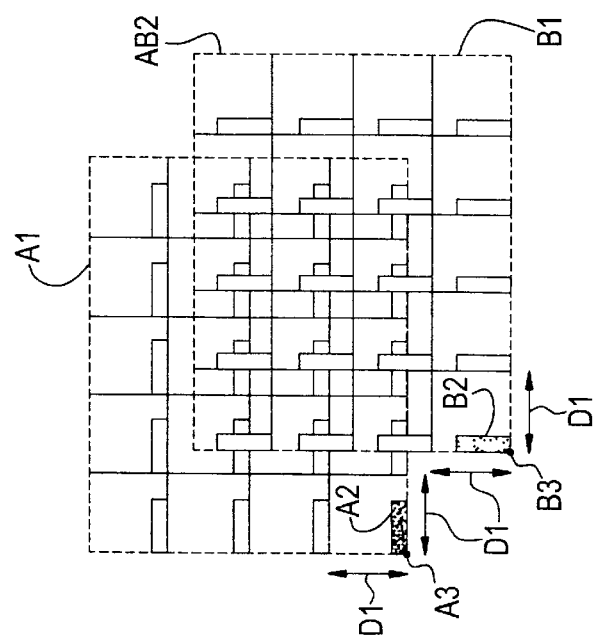
FIG. 4A shows array AB2 in which arrays A1 and B1 are arrayed such that their grid origins do not coincide.
Figure 6:
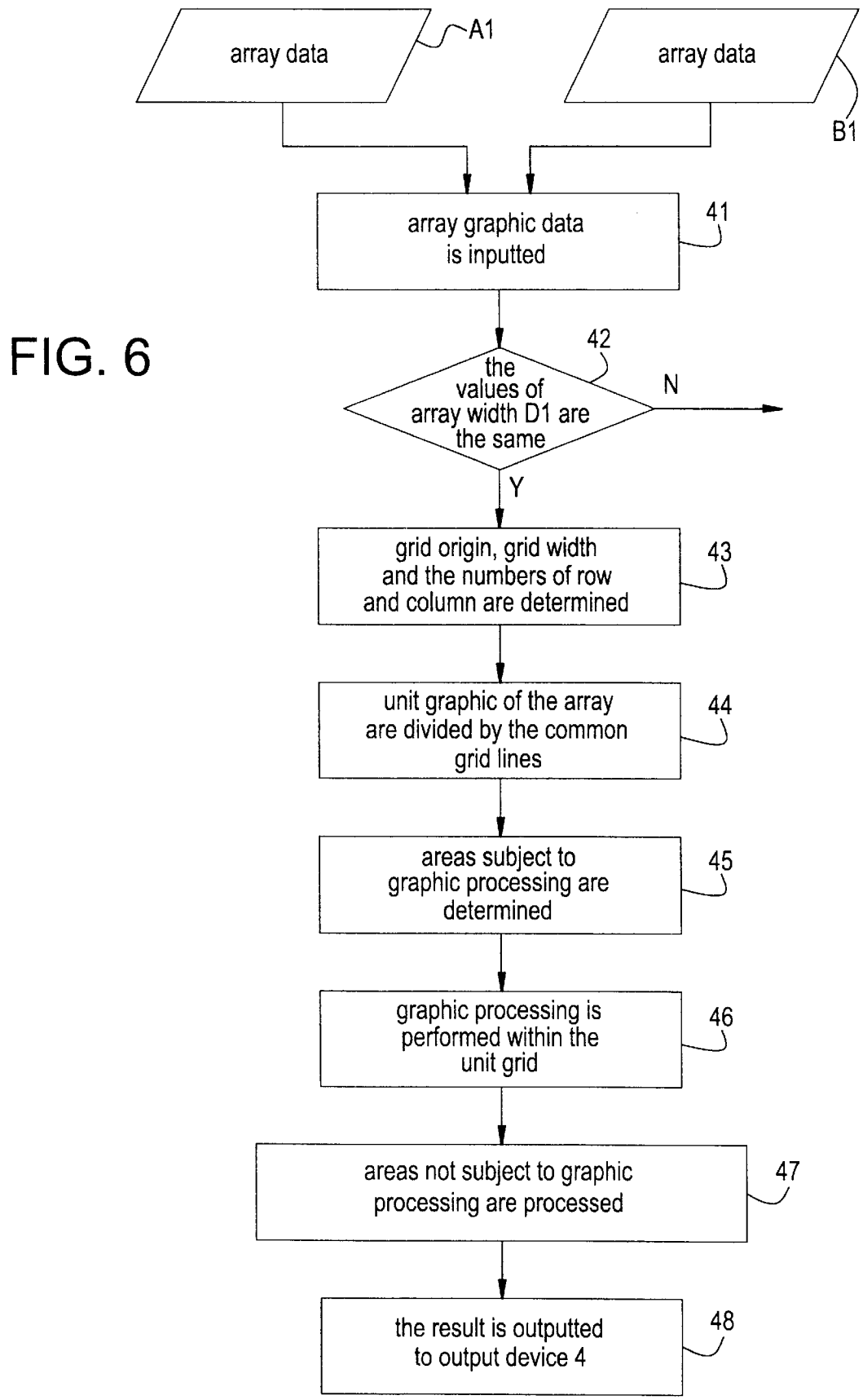
FIG. 6 is a flow chart illustrating the operation of the graphic data processing device shown in FIG. 5.
Figure 7A:
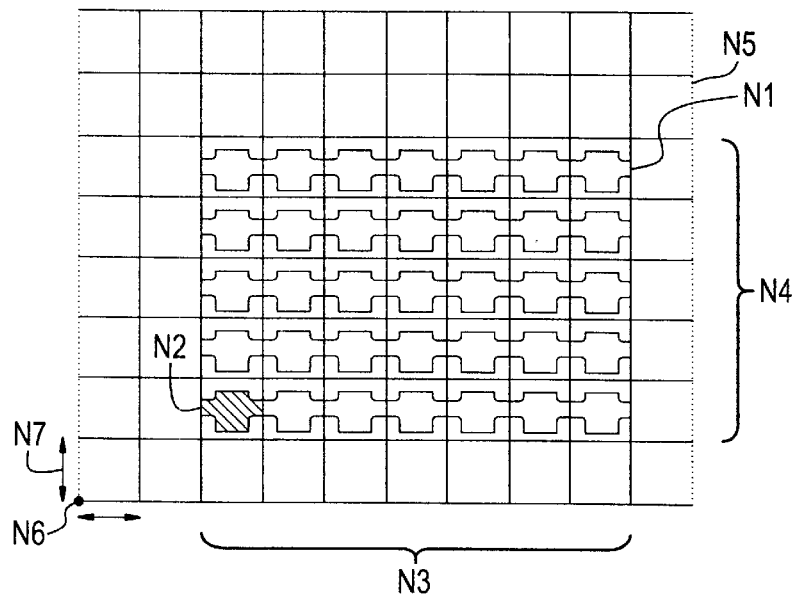
FIGS. 7A to 7C show one example of input data of the graphic data processing device shown in FIG. 5.
Figure 7B:
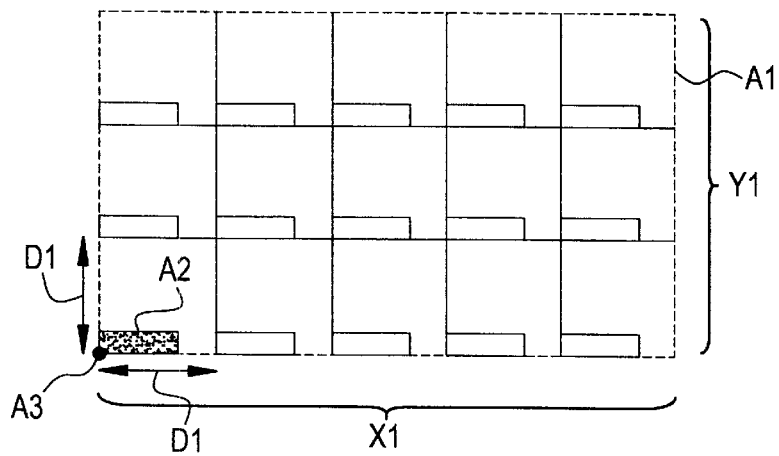
Figure 7C:
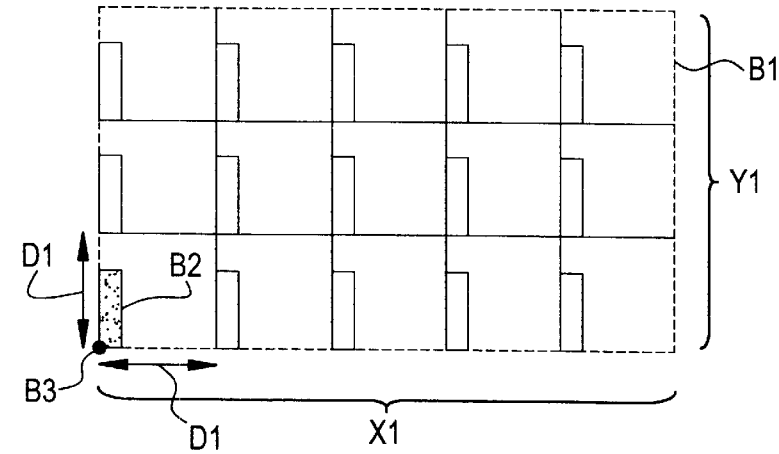
Figure 8A:
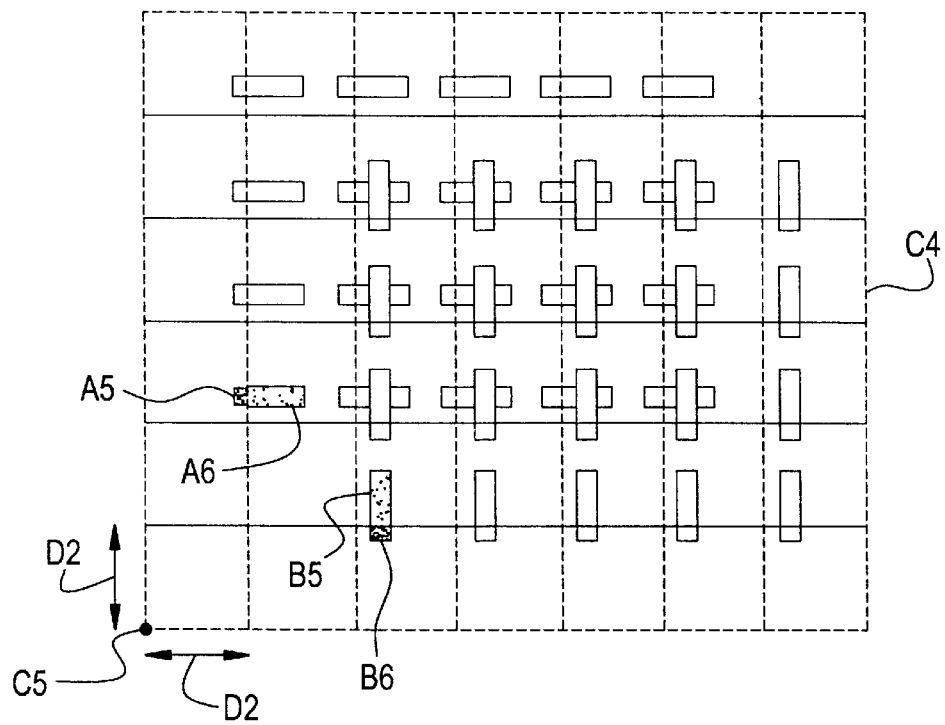
FIG. 8A shows array A1 and array B1 arranged in an overlapping state as array AB2.
Figure 8B:
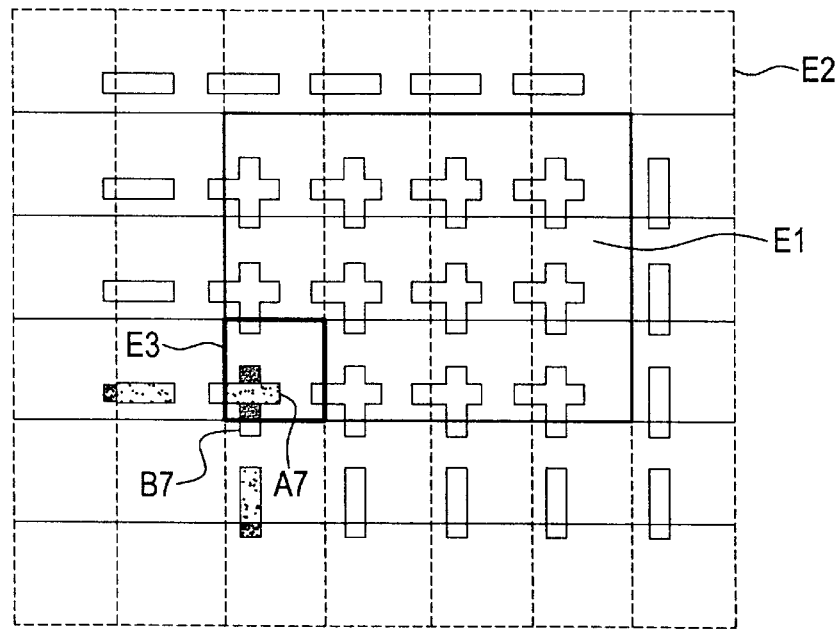
FIG. 8B shows array AB2 sorted between an area E1 in which array A1 and array B1 overlap and an area E2 in which array A1 and array B1 do not overlap.
Figure 9A:
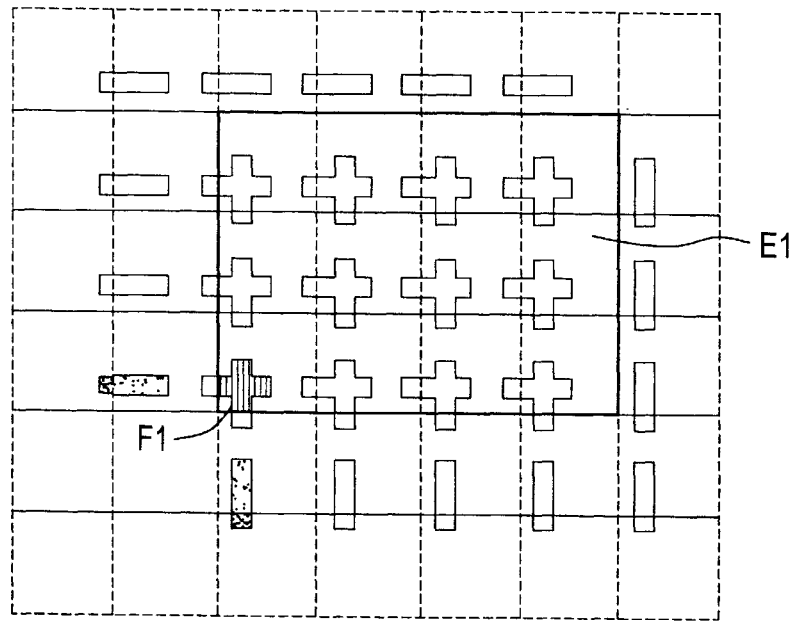
FIG. 9A shows a graphic F1 determined as the result of the logical OR processing of graphics A7 and B7 of FIG. 4B.
Figure 9B:
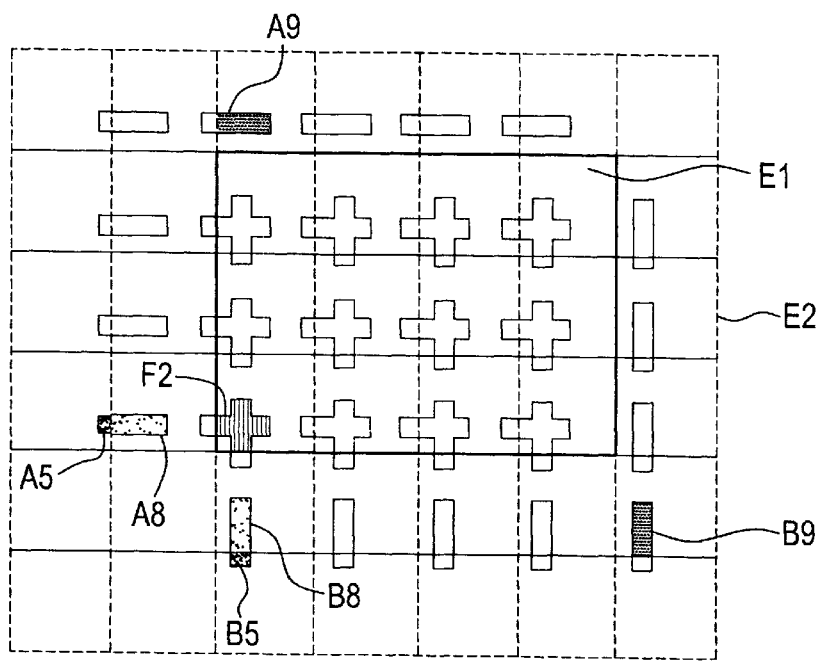
FIG. 9B shows array graphic data F2 that takes graphic F1 as a unit graphic.

As a first example, a case will be described in which two sets of systematically arrayed graphic data having differing grid origins are inputted, and logical OR graphic processing is performed. As in the prior-art example, array A1 and array B1 shown in FIGS. 7B and 7C will be taken as the input data, and this data is inputted in a form in which the grid origins of the array grids differ as for array AB2 shown in FIG. 4A. Here, array A1 and array B1 have equal grid width D1, array row number X1 and array column number Y1, but their grid origins A3 and B3, and their unit graphics A2 and B2 are different. Next, the operation of this example will be explained in accordance with the flow chart of FIG. 6 and with reference to the block diagram of FIG. 5 as well as the operational diagrams of FIGS. 7, 8, and 9. First, input device 2 stores the values of unit graphics A2 and B2 of array A1 and array B1, grid origins A3 and B3, grid width D1, array row number X1, and array column number Y1 to array graphic data storage section 11 of storage device 1. In Step 41, array information analyzing unit 31 of data processing device 3 next reads the array width D1 of array A1 and array B1 from array graphic data storage section 11. In Step 42, it is determined whether or not the values of array width D1 of array A1 and B1 are the same. If the values of the grid width for the input arrays are different, this graphic processing device cannot be used, and graphic processing must be executed by a processing device of the prior art. If the grid width is equal for arrays A1 and B1, processing is next carried out in array graphic converting unit 32. It is supposed that array A1 and array B1 are arranged in an overlapping state as array AB2 of FIG. 4. Here, an array that is a systematically arrayed graphic synthesized from array A1 and array B1 is taken as array C4. It is supposed that as shown in FIG. 8A, array C4 is made up of grid origin C5 and grid width D2. In Step 43, the grid origin C5 of the array grid is determined as any arbitrary point, for example, origin (0, 0). The grid width D2 of array C4 is determined to be equal to grid width D1. Unit graphic A2 of array A1 is next divided by the grid lines of the hereby established array C4, and new array graphic data A5 and A6 (FIG. 8A) are then determined. In Step 44, unit graphic B2 of array B1 is divided by the grid lines of array grid C1 in the same way, and new array graphic data B5 and B6 (FIG. 8A) are determined. At this point, array graphic data A5, A6, B5, and B6 have been established that are arranged on a common array grid C4. These arrays have the same array grid (their grid origins coincide) and graphic processing can therefore be performed without any need for expanding the arrays. In the present embodiment, the logical OR of array A1 and array B1 is next calculated, and in Step 45, array AB2 is sorted as shown in FIG. 8A between area E1 in which arrays A1 and B1 overlap and area E2 in which arrays A1 and B1 do not overlap, and graphic processing is performed for only area E1. First, in Step 46, in order to find the unit graphic, graphic processing is performed within lower left grid frame E3 within area E1. As a result of the logical OR graphic processing of graphic A7 and graphic B7 of FIG. 8B, graphic F1 is determined as shown in FIG. 9A. Here, as shown in FIG. 9B, array graphic data F2 which take graphic F1 as the unit graphic is determined in Step 46, and the graphic processing of area E1 is determined. The remaining area E2 is not a subject of graphic processing and graphic processing is therefore not performed. In Step 47, therefore, area E2 is represented by the four arrays, array graphic data A8, array graphic data A9, array graphic data B8, and array graphic data B9, as shown in FIG. 9B. As described hereinabove, the array graphic data A5, B5, A8, A9, B8, B9, and F2 on common array grid C4 can be found through processing by array graphic converting section 32. The values for each are next stored to converted array graphic data storage section 12 of storage device 1. Finally, in Step 48, the array graphic data, which are the results of graphic processing stored in converted array graphic data storage section 12, are outputted to output device 4.

Figure 10A:
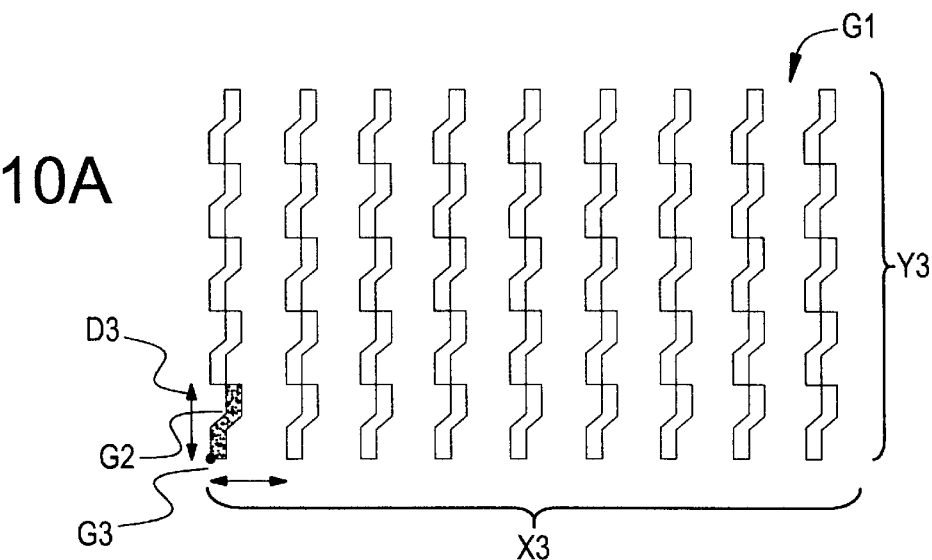
FIGS. 10A to 10C show other examples of input data of graphic data processing device of FIG. 5.
Figure 10B:
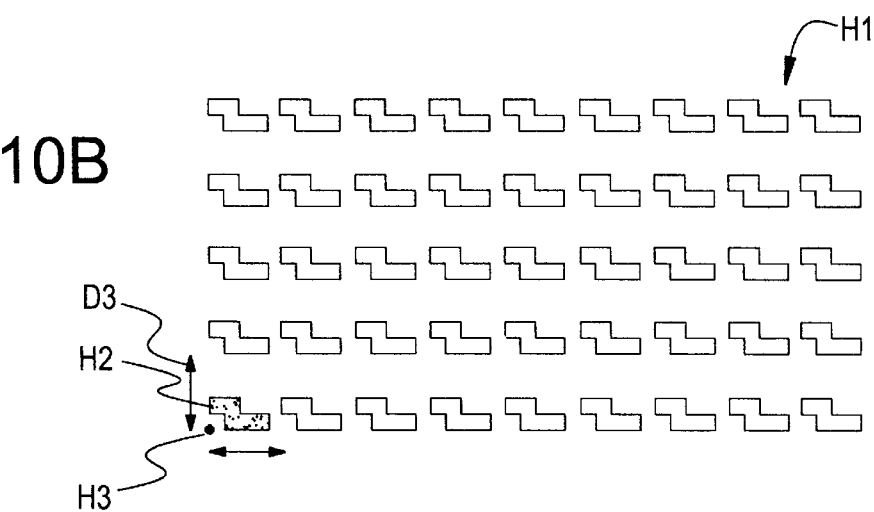
Figure 10C:
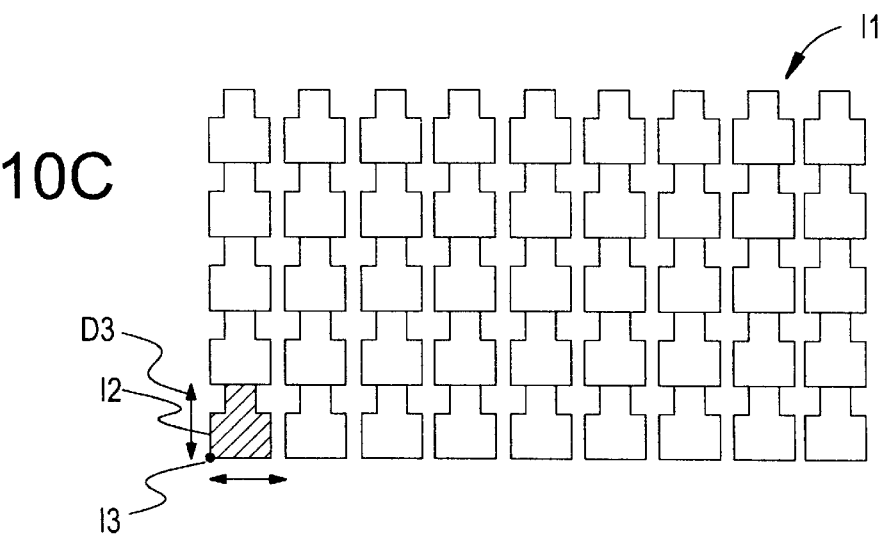
Figure 11A:
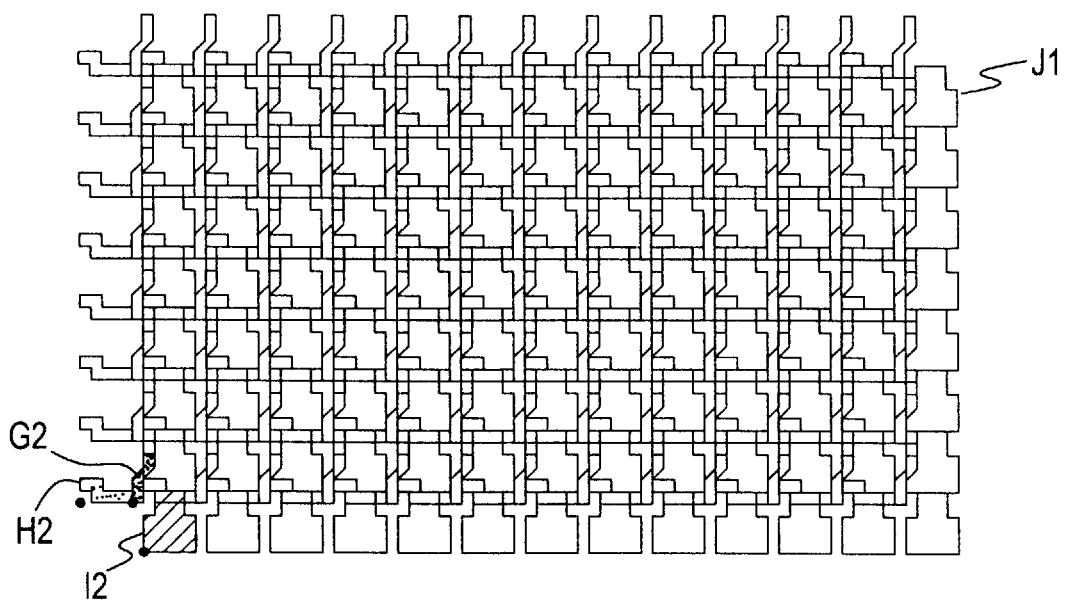
FIG. 11A shows array graphic data J1 arrayed as the overlap of array graphic data G1, H1, and I1 of FIG. 10.
Figure 11B:
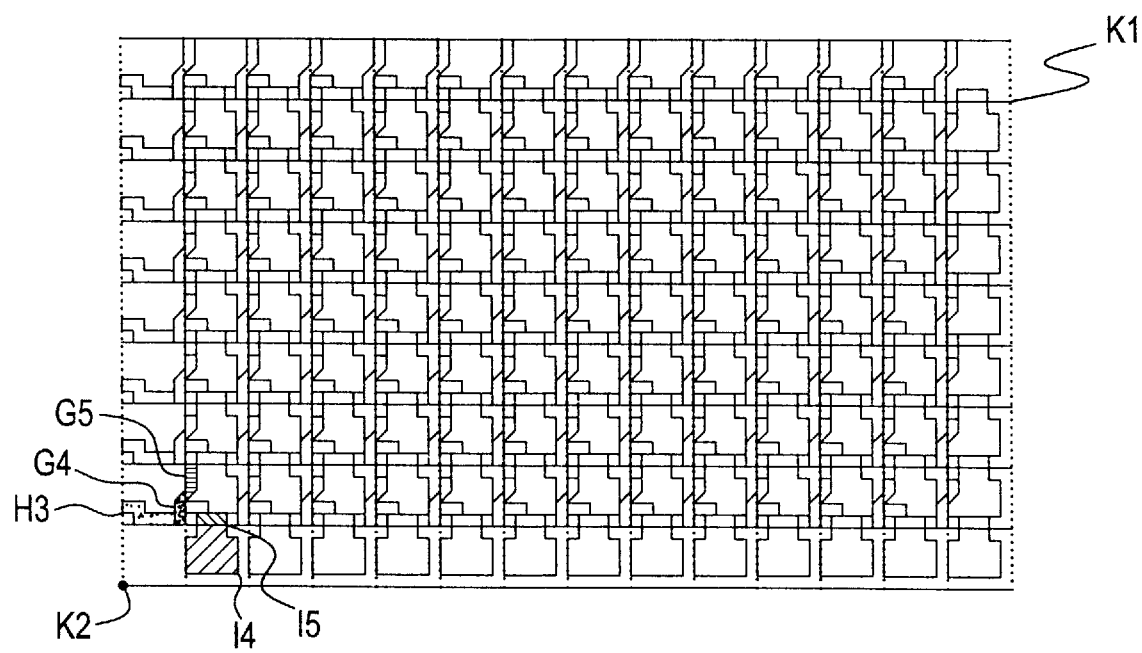
FIG. 11B shows array grid K1 for array graphic data J1.
Figure 12A:
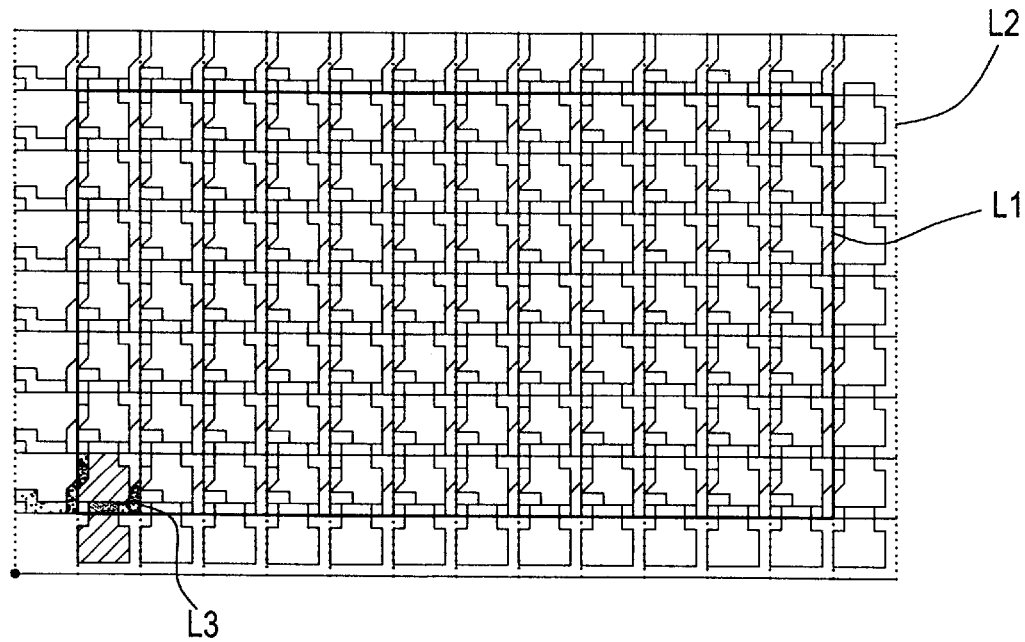
FIG. 12A shows array graphic data J1 of FIG. 11 in a state divided between area L1 having overlap in the array and an area L2 having no overlap.
Figure 12B:
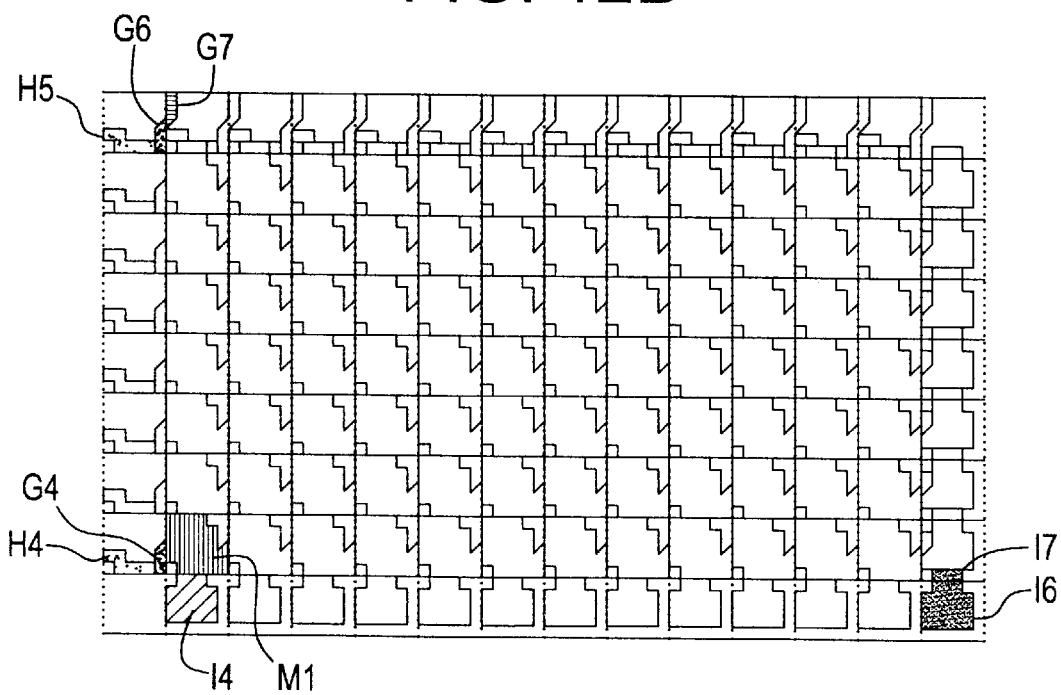
FIG. 12B shows array graphic data M1 obtained as a result of logical OR processing of a graphic contained in area L3.

As a second example, explanation will be presented regarding logical OR graphic processing when three sets of array graphic data G1, H1, and I1 shown in FIG. 10 are arranged and inputted as in array graphic data J1 of FIG. 11. It will first be assumed that the three sets of array graphic data G1, H1, and I1 have equal grid width D3, equal array row number X3, and equal array column number Y3. As shown in FIG. 10, array data G1 has unit graphic G2 and grid origin G3, and similarly, array data H1 has unit graphic H2 and grid origin H3, and array data I1 has unit graphic I2 and grid origin I3. The progression of processing will be explained based on the flow chart of FIG. 6 and the explanatory views of the operation shown in FIGS. 11 and 12. Array graphic data G1, H1 and I1, which are the input data, are first inputted in Step 41. Because the values for the array grid width of the three sets of array data G1, H1 and I1 are equal at D3, it is determined in Step 42 that the present invention can be applied. Array K1 is next considered for array graphic data J1 (FIG. 11B). At this time, array K1 is made up of grid origin K2 and grid width D3. In Step 44, unit graphics G2 and I2 are divided by the grid lines of this array K1, and array graphic data G4 and G5 as well as I4 and I5 (FIG. 11B) which take G2 and I2, respectively, are determined as unit graphics. In Step 45, array graphic data J1 is divided between area L1 in which arrays overlap and area L2 in which no overlap exists (FIG. 12A), and graphic processing is executed for area L1. Area L1 is composed of graphics that are arranged repeatedly at grid width D3, and as a result, graphic processing need only be executed for one grid, and the graphic processing of area L1 can be determined by finding an array that takes the output graphic as unit graphic. Area L3 is considered in Step 46, and the logical OR graphic processing of graphics contained within area L3 is executed. As a result of graphic processing, the output graphic of the logical OR graphic operation is taken as the unit graphic, and array graphic data M1 made up of array K1 (FIG. 12B) is determined. To also represent area L2 by array graphic data, the area is divided and represented by array graphic data I4, I6, and I7, array graphic data H4 and H5, and array graphic data G6 and G7 (FIG. 12B) in Step 47. The above-described process determines array graphic data G4, G6, G7, H4, H5, I4, I6, I7 and M1, which are the output result of logical OR graphic processing of input array graphic data G1, H1 and I1.

While preferred embodiments of the present invention have been described using specific terms, such description is for illustrative purposes only, and it is to be understood that changes and variations may be made without departing from the spirit or scope of the following claims.

What is claimed is:

1. A graphic data processing method comprising the steps of:

inputting array graphic data for first, second, . . . and nth ($n \geq 2$) arrays that are arranged in overlapping positions and that have identical grid width, number of array rows, and number of array columns but have differing grid origin and unit graphics;

determining grid origin of a common array which is a systematic array graphic in which said first to nth arrays are synthesized, and determining grid width of said common array as a value equal to grid widths of said first to nth arrays;

dividing said first to nth unit graphics at grid lines of said common array and determining new array graphic data;

determining areas in which said first to nth arrays of said common array overlap as areas to be subjected to graphic processing;

executing a logical OR process of said determined array graphic data within a grid frame of any corner of said areas to be subjected to graphic processing, and finding a unit graphic of said common array; and outputting determined array graphic data of areas besides those to be subjected to graphic processing, and unit graphics of said common array.

2. A graphic data processing device comprising:

an input device that inputs array graphic data of first, second, . . . and nth ($n \geq 2$) arrays that are arranged in overlapping positions and that have identical grid width, number of array rows, and number of array columns, but have differing grid origin and unit graphics;

an array graphic data storage device that stores said array graphic data;

a data processing device that comprises array information analyzing means that reads array widths of said first to nth arrays from said array graphic data storage device and confirms that these array widths are equal; array graphic converting means that determines grid origin of a common array which is a systematic array graphic in which said first to nth arrays are synthesized, determines grid width as a value equal to grid widths of first to nth arrays, divides said first to nth unit graphics at grid lines of said common array, and determines new array graphic data; and graphic processing means that determines areas in which first to nth arrays overlap in said common array as areas to be subjected to graphic processing, executes logical OR processing of said determined array graphic data within a grid frame of any corner of said areas to be subjected to graphic processing, and finds unit graphics of said common array; and an output device that outputs determined array graphic data of areas besides those to be subjected to graphic processing, and unit graphics of said common array.

* * * * *